(12) United States Patent
Xiong (10) Patent No.: US 12,130,712 B2
(45) Date of Patent: Oct. 29, 2024

(54) DATA MIGRATION METHOD AND APPARATUS FOR DATABASE

(71) Applicant: HUAWEI CLOUD COMPUTING TECHNOLOGIES CO., LTD., Guizhou (CN)

(72) Inventor: Gang Xiong, Hangzhou (CN)

(73) Assignee: Huawei Cloud Computing Technologies Co., Ltd., Guizhou (CN)

( * ) Notice: Subject to any disclaimer, the term of this patent is extended or adjusted under 35 U.S.C. 154(b) by 5 days.

(21) Appl. No.: 17/947,388

(22) Filed: Sep. 19, 2022

(65) Prior Publication Data

US 2023/0015941 A1 Jan. 19, 2023

Related U.S. Application Data

(63) Continuation of application No. PCT/CN2021/078309, filed on Feb. 27, 2021.

(30) Foreign Application Priority Data

Mar. 20, 2020 (CN) .......................... 202010203407.X (51) Int. Cl.
*G06F 11/14* (2006.01)
*G06F 11/20* (2006.01)
*G06F 16/21* (2019.01)

(52) U.S. Cl.
CPC ...... *G06F 11/1471* (2013.01); *G06F 11/1469* (2013.01); *G06F 11/203* (2013.01); *G06F 16/214* (2019.01)

(58) Field of Classification Search
None
See application file for complete search history.

(56) References Cited

U.S. PATENT DOCUMENTS

| 2008/0080514 A1* | 4/2008 | Louzoun ............... G06F 15/167 370/412 |
| 2008/0162590 A1 | 7/2008 | Kundu et al. |
| 2010/0153341 A1* | 6/2010 | Driesen ................. G06F 16/214 707/661 |

(Continued)

FOREIGN PATENT DOCUMENTS

| CN | 104123201 A | 10/2014 |
| CN | 104573056 A | 4/2015 |

(Continued)

OTHER PUBLICATIONS

Anonymous, "Oracle Active Data Guard Real-Time Data Protection and Availability," Oracle, Oct. 2015, XP055435626, 21 pages.

(Continued)

*Primary Examiner* — Giuseppi Giuliani
(74) *Attorney, Agent, or Firm* — Fish & Richardson P.C.

(57) ABSTRACT

In one example method, a second memory stores data in a database, and the second memory is a memory independent of a first device and a second device. When determining that a database service needs to be switched, the first device may migrate a redo log of the database from a first memory of the first device to the second memory. The second device migrates the redo log from the second memory to a third memory of the second device, and the first device and the second device perform operating system status migration online.

15 Claims, 4 Drawing Sheets

(56) References Cited

U.S. PATENT DOCUMENTS

2012/0303581 A1   11/2012  Calder et al.
2017/0097855 A1*  4/2017  Hart ..................... G06F 9/5088
2017/0116213 A1   4/2017  Jain et al.

FOREIGN PATENT DOCUMENTS

| CN | 108073656 A | 5/2018 |
| CN | 109635024 A | 4/2019 |
| CN | 110019066 A | 7/2019 |

OTHER PUBLICATIONS

Greenwald et al., "Oracle Essentials: Oracle Database 11g, Fourth Edition Edition", O'Reilly, Nov. 2007, 408 pages.
Mcgregor et al., "Oracle Database 2 Day DBA, 10g Release 1 (10.1)," Oracle, Mar. 2004, XP055394280, 166 pages.
Extended European Search Report in European Appln No. 21770505.2, dated Jun. 22, 2023, 11 pages.
International Search Report and Written Opinion in International Appln. No. PCT/CN2021/078309, mailed on May 26, 2021, 15 pages (with English translation).

\* cited by examiner

FIG. 6

DATA MIGRATION METHOD AND APPARATUS FOR DATABASE

CROSS-REFERENCE TO RELATED APPLICATIONS

This application is a continuation of International Patent Application No. PCT/CN2021/078309, filed on Feb. 27, 2021, which claims priority to Chinese Patent Application No. 202010203407.X, filed on Mar. 20, 2020. The disclosures of the aforementioned applications are hereby incorporated by reference in their entireties.

TECHNICAL FIELD

This disclosure relates to the field of communication technologies, and in particular, to a data migration method and apparatus for a database.

BACKGROUND

Generally, a database service may be deployed on different physical machines, and a deployment location of the database service may be changed as required. In other words, the database service needs to be switched across the physical machines.

During switching of the database service across the physical machines, a file and data in a database needs to be switched from one physical machine to another physical machine. The file and data in the database include but are not limited to a log in the database and data stored in the database.

Currently, in a process of switching the database service across the physical machines, a connection between a client and a physical machine generally needs to be interrupted. As a result, the database service is interrupted, the database service cannot be provided for a user, and user experience is poor.

SUMMARY

This disclosure provides a data migration method and apparatus for a database, to provide an efficient database service migration method.

According to a first aspect, an embodiment of this disclosure provides a data migration method for a database. The method is used to switch a database service deployed by a first device to a second device, a second memory stores data in a database, and the second memory is a memory independent of the first device and the second device. In other words, the second memory is not a memory in the first device or the second device. The method may be performed by the first device. When determining that the database service needs to be switched, the first device may migrate a redo log of the database from a first memory of the first device to the second memory, and then update an operating system status of the first device to the second device, in other words, perform operating system status migration online. Generally, a migration process may occur instantaneously, and occupies a short time.

According to the foregoing method, with the help of the second memory, the first device and the second device may perform database server migration online, and the second memory stores the data and the redo log in the database, so that the first device provides the database service for a user before operating system status migration is performed online. The second device can also provide the database service for the user after operating system status migration is performed online. The database service is not interrupted, and the user does not perceive switching of the database service, so that user experience can be effectively improved.

In a possible implementation, the first device further includes an extend buffer pool, and before migrating the data in the database from the first memory of the first device to a third memory of the second device, the first device may disable the extend buffer pool in the first device, where the extend buffer pool in the first device is configured to store data whose data read/write frequency is greater than a threshold in the database.

According to the foregoing method, the extend buffer pool of the first device is disabled, so that the second device cannot view data in the extend buffer pool, to ensure data security.

In a possible implementation, the first memory may store a first redo log and a second redo log. The first device may generate the first redo log based on a data change of the database, and after determining that the database service deployed by the first device needs to be migrated to the second device, the first device copies data in the first redo log to the second redo log.

According to the foregoing method, the first memory maintains two redo logs, to ensure that the data change of the database can be recorded in the first redo log, and ensure that the second redo log can be migrated to the second memory when it is determined to switch the database service.

In a possible implementation, when migrating the redo log of the database from the first memory of the first device to the second memory, the first device may migrate the second redo log from the first memory to the second memory.

According to the foregoing method, the first memory still stores the first redo log, to ensure that in a process of migrating the redo log, the first device can still record the data change of the database, and ensure that the database service can be provided.

In a possible implementation, when copying the data in the first redo log to the second redo log, the first device may copy all data, or may copy a part of data. For example, the first device may determine valid data in the first redo log based on a checkpoint and a latest write point in the first redo log, and copy the valid data to the second redo log.

According to the foregoing method, the first device only needs to copy a part of data in the first redo log to the second redo log, to effectively save time, and improve database service migration efficiency.

In a possible implementation, after determining that the database service deployed by the first device needs to be migrated to the second device, and before migrating the second redo log from the first memory to the second memory, if the data in the database changes, the first device may update the first redo log and the second redo log based on the data change of the current database.

According to the foregoing method, the first redo log and the second redo log can record a latest data change of the database, to ensure integrity of the two redo logs.

In a possible implementation, when disabling the extend buffer pool in the first device, the first device may stop migrating data in or out of the extend buffer pool, or may release storage space of the extend buffer pool in the first device.

According to the foregoing method, the first device may disable the extend buffer pool in the first device online, to conveniently release the storage space.

According to a second aspect, an embodiment of this disclosure provides a data migration method for a database. The method is used to switch a database service deployed by a first device to a second device, a second memory is independent of the first device and the second device, and the second memory stores data in a database. In the method, the second device may migrate a redo log of the database from the second memory to a third memory of the second device, and then perform operating system status migration with the first device.

According to the foregoing method, with the help of the second memory, the first device and the second device may perform database server migration online, and the second memory stores the data and the redo log in the database, so that the first device provides the database service for a user before operating system status migration is performed online. The second device can also provide the database service for the user after operating system status migration is performed online. The database service is not interrupted, and the user does not perceive switching of the database service, so that user experience can be effectively improved.

In a possible implementation, after performing operating system status migration with the first device, the second device may enable an extend buffer pool in the second device, where the extend buffer pool in the second device is configured to store data whose data read/write frequency is greater than a threshold in the database.

According to the foregoing method, the extend buffer pool is disposed in the second device, to effectively extend a buffer pool, store more data, and improve data read/write efficiency of the second device.

According to a third aspect, an embodiment of this disclosure further provides a data migration apparatus. The apparatus is applied to a first device. For beneficial effects, refer to descriptions of the first aspect. Details are not described herein again. The apparatus has a function of implementing the behavior in the method instance in the first aspect. The function may be implemented by hardware, or may be implemented by hardware executing corresponding software. The hardware or the software includes one or more modules corresponding to the foregoing function. In a possible design, a structure of the apparatus includes a log migration unit and a status migration unit, and may further include a control unit. These units may perform corresponding functions in the method example in the first aspect. For details, refer to detailed descriptions in the method example. Details are not described herein again.

According to a fourth aspect, an embodiment of this disclosure further provides a data migration apparatus. The apparatus is applied to a second device. For beneficial effects, refer to descriptions of the second aspect. Details are not described herein again. The apparatus has a function of implementing the behavior in the method instance in the second aspect. The function may be implemented by hardware, or may be implemented by hardware executing corresponding software. The hardware or the software includes one or more modules corresponding to the foregoing function. In a possible design, a structure of the apparatus includes a log migration unit and a status migration unit, and may further include a control unit. These units may perform corresponding functions in the method example in the second aspect. For details, refer to detailed descriptions in the method example. Details are not described herein again.

According to a fifth aspect, an embodiment of this disclosure further provides a computing device. The computing device includes a processor and a memory, and may further include a communication interface. The processor may execute program instructions in the memory to perform the method according to any one of the first aspect or the possible implementations of the first aspect. The processor may alternatively execute the program instructions in the memory to perform the method according to any one of the second aspect or the possible implementations of the second aspect. The memory is coupled to the processor, and the memory stores the program instructions and data that are necessary for data synchronization. The communication interface is configured to communicate with another device (for example, a client device).

According to a sixth aspect, this disclosure provides a computing device system. The computing device system includes at least one computing device. Each computing device includes a memory and a processor. The processor in the at least one computing device may be configured to access code in the memory to perform the method according to any one of the first aspect or the possible implementations of the first aspect. The processor in the at least one computing device may alternatively be configured to access code in the memory to perform the method according to any one of the second aspect or the possible implementations of the second aspect.

According to a seventh aspect, this disclosure provides a non-transient readable storage medium. When the non-transient readable storage medium is executed by a computing device, the computing device may perform the method according to any one of the first aspect or the possible implementations of the first aspect. The computing device may alternatively perform the method according to any one of the second aspect or the possible implementations of the second aspect. The storage medium stores a program. The storage medium includes but is not limited to a volatile memory, for example, a random access memory, or a non-volatile memory, such as a flash memory, a hard disk drive (HDD), and a solid-state drive (SSD).

According to an eighth aspect, this disclosure provides a computing device program product. The computing device program product includes computer instructions. When the instructions are executed by a computing device, the computing device may perform the method according to any one of the first aspect or the possible implementations of the first aspect. The computing device may alternatively perform the method according to any one of the first aspect or the possible implementations of the first aspect. The computer program product may be a software installation package. When the method according to any one of the first aspect or the possible implementations of the first aspect, or any one of the second aspect or the possible implementations of the second aspect needs to be used, the computer program product may be downloaded and executed on the computing device.

DESCRIPTION OF EMBODIMENTS

Figure 1:
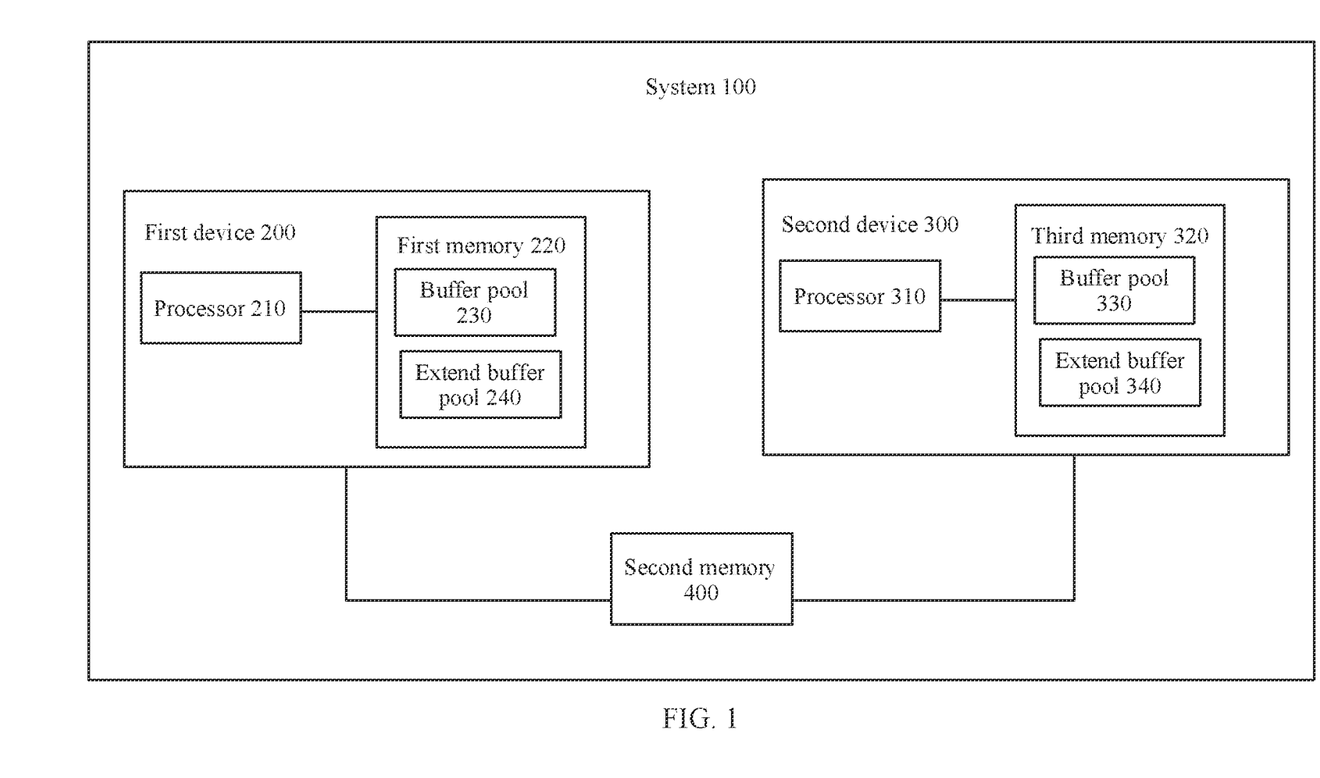
FIG. 1 is a schematic diagram of an architecture of a system according to this disclosure.

FIG. 1 is a schematic diagram of a structure of a system according to an embodiment of this disclosure. The system 100 includes a first device 20, a second device 300, and a second memory 400.

The first device 200 is a source device on which a database service is currently deployed, and a second device 300 is a target device on which a database service is to be deployed.

The first device 200 includes a processor 210 and a first memory 220. The first memory may include a volatile memory, for example, a random access memory (RAM). The first memory may further include a non-volatile memory (NVM), for example, a read-only memory (ROM), a flash memory, a hard disk drive (HDD), or a solid-state drive (SSD). The first memory may store related files, such as a redo log and a logical log, of a database. The second memory 400 may store data in the database.

It should be noted that the data in the database does not include the redo log and the logical log of the database, and the data in the database means original data that needs to be stored in the database.

The first device 200 further includes a buffer pool 230 and an extend buffer pool 240. The buffer pool 230 and the extend buffer pool 240 may be located in the first memory 220.

The buffer pool 230 and the extend buffer pool 240 each are configured to store data with a high read frequency in the database. When the first device 200 reads the data in the database, the processor 210 preferably reads the data from the buffer pool 230. When the data is not stored in the buffer pool 230, if the data is stored in the extend buffer pool 240, the buffer pool 230 may load the data from the extend buffer pool 240, so that the processor 210 reads the data from the buffer pool 20. If neither the buffer pool 230 nor the extend buffer pool 240 stores the data, for example, the data is stored in the first memory 220, the buffer pool 230 may load the data from the first memory 220, so that the processor 210 reads the data from the buffer pool 20.

A structure of the second device 300 is similar to a structure of the first device 200. The second device 300 includes a processor 310 and a third memory 320, and further includes a buffer pool 330 and an extend buffer pool 340. Descriptions of the processor 310, the third memory 320, the buffer pool 330, and the extend buffer pool 340 are similar to the descriptions of the processor 210, the second memory 400, the buffer pool 230, and the extend buffer pool 240. Reference may be made to the foregoing content, and details are not described herein again.

In this embodiment of this disclosure, the second memory 400 is independent of the first device 200 and the second device 300, and can be used as a relay memory of the data in the database and the related file in the database.

In this embodiment of this disclosure, switching of the database service may be performed between the first device 200 and the second device 300. In this embodiment of this disclosure, the first device 200 may first migrate the redo log of the database from the first memory 220 to the second memory 400. After operating system status migration between the first device 200 and the second device 300 is completed, the second device may migrate the redo log of the database in the second memory 400 to the third memory 320.

Figure 2:
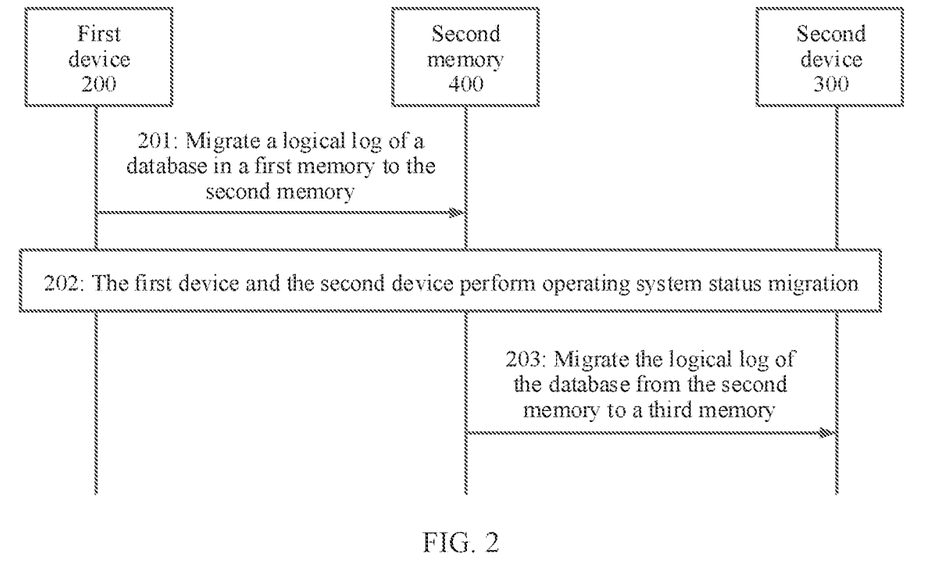
FIG. 2 is a schematic diagram of a data migration method for a database according to this disclosure.

With reference to FIG. 2, the following describes a data migration method for a database according to an embodiment of this disclosure. The method includes the following steps.

Step 201: A first device 200 migrates a redo log of a database in a first memory 220 to a second memory 400.

Step 202: The first device 200 and the second device 300 perform operating system status migration, and the second device 300 updates an operating system of the second device 300 based on an operating system status of the first device 200. In this way, after operating system status migration is performed, an operating system status of the second device 300 is consistent with the operating system status of the first device 200.

Step 203: After operating system status migration is completed, the second device 300 migrates the redo log of the database from the second memory 400 to a third memory 320 in the second device 300.

In the database, the redo log may also be understood as a physical log, and is used to record a data change and changed data in the database. The data change includes insertion, deletion, update, and the like. The data insertion means adding new data to the database, the data deletion means deleting data in the database, and the data update means changing one piece of data in the database to another piece of data.

When the data in the database changes, the first device 200 generates a corresponding redo log after detecting the data change. When determining that the database service needs to be switched to the second device 300, the first device 200 may first migrate the redo log of the database.

When performing step 201, the first device 200 may directly migrate the redo log stored in the first memory 220 to the second memory 400, or may preconfigure two redo logs in the first memory 220. For ease of distinguishing, the two redo logs are respectively a first redo log and a second redo log, and the second redo log may be used as a backup of the first redo log.

When detecting that the data in the database changes, the first device 200 may record the data change of the database in the first redo log, and then copy data in the first redo log to the second redo log.

A manner in which the first device 200 copies the data in the first redo log to the second redo log is not limited in this embodiment of this disclosure.

For example, when recording the data change in the first redo log, the first device 200 copies recorded content to the second redo log. To be specific, the data in the first redo log is synchronized with data in the second redo log, and the second redo log stores all data in the first redo log.

For another example, when determining that the database service needs to be switched, the first device 200 may alternatively copy the data in the first redo log to the second redo log. In this case, the first device 200 may copy all data in the first redo log to the second redo log, or may copy only a part of data in the first redo log to the second redo log.

It should be noted that there are many cases in which the first device 200 determines that the database service needs to be performed. This is not limited in this embodiment of this disclosure. For example, when receiving a database migration instruction triggered by a user, the first device 200 determines that the database service needs to be switched. For another example, when receiving a database migration request initiated by another device (for example, the second device 300), the first device 200 determines that the database service needs to be switched.

In a possible implementation, when copying the data in the first redo log to the second redo log, the first device 200 may first locate valid data in the first redo log. The valid data is data that needs to be copied to the second redo log, and the valid data is data that can be used for fault recovery when the first device 200 sends a fault. The valid data is determined based on a checkpoint and a latest write point (for example, a latest recorded queue change (sequence number)) in the first redo log, where the checkpoint is a data node that is set when dirty page data (namely, data whose read/write frequency is zero) is written into the first memory 220.

After locating the valid data, the first device 200 may migrate the valid data to the second redo log.

After copying the data in the first redo log to the second redo log, the first device 200 may migrate the second redo log to the second memory 400. The second memory 400 and the first memory 220 are located in different data centers. To be specific, the first memory 220 and the second memory 400 are deployed at different locations, and are located in different devices.

It should be noted that, after determining that the database service needs to be switched, in a process in which the first device 200 copies the data in the first redo log to the second redo log, if the data in the database changes at this time, the first device 200 may further update the first redo log and the second redo log based on the data change of the database. That is, the first device 200 records the data change of the current database in the first redo log and the second redo log at the same time.

When the second redo log is migrated to the second memory 400, the first device 200 may still provide the database service. When the data in the database changes, the first device 200 may still record the data change in the redo log. In this case, the first device 200 may record the data change in the second redo log.

After migration of the redo log is performed, the first device 200 and the second device 300 may perform operating system status migration, that is, perform step 202. The first device 200 may update the operating system status to the second device 300, where the operating system status is a processing status that records components such as a buffer pool and a processor of the first device 200, and the operating system status includes a status of a transmission control protocol (TCP)/Internet protocol (IP) protocol stack.

The status of the TCP/IP protocol stack records a status of an operating system communication layer of the first device 200. Migration of the status of the TCP/IP protocol stack may ensure that when a connection between a client and the database is migrated from the first device 200 to the second device 300, the connection between the client and the database and a data processing status in the connection remain unchanged, the client does not perceive a change caused by migration of the database service, and the client does not need to reconnect to the database.

After the first device 200 and the second device 300 complete operating system status migration, the second device 300 may replace the first device 200 to provide the database service. When the data in the database changes, the second device 300 may record the data change in the redo log. In this case, the second device 300 may record the data change in the redo log in the second memory 400.

The second device 300 may further migrate the redo log of the database from the second memory 400 to the third memory 320. Because the third memory 320 is a local memory of the second device 300 and has a high read/write speed, after the redo log of the database is migrated to the third memory 320, the second device 300 may more conveniently record the data change in the redo log in the local memory.

In this embodiment of this disclosure, when the database service is switched between different devices, there is no need to disable any device, and migration of the redo log is implemented by using the relay memory. The database service is not interrupted, and the user does not perceive switching of the database service, so that user experience can be effectively improved.

In this embodiment of this disclosure, in addition to migrating the redo log and the data in the database during the database migration process, if the first device 200 and the second device 300 each include an extend buffer pool, the first device 200 and the second device 300 are further allowed to enable or disable the extend buffer pool in this embodiment of this disclosure.

Before the first device 200 and the second device 300 perform operating system status migration, the first device 200 may disable an extend buffer pool 240 of the first device 200. The disabling the extend buffer pool 240 of the first device 200 means that the extend buffer pool 240 no longer continues to store data.

Data is not migrated in or out of the extend buffer pool 240. In other words, a buffer pool 230 no longer loads the data from the extend buffer pool. The extend buffer pool 240 also does not need to copy data in the buffer pool 230 to the extend buffer pool 240.

In addition, the first device 200 may further release the data that has been stored in the extend buffer pool 40, for example, delete the data that has been stored in the extend buffer pool.

Because the first device 200 needs to switch the database service to the second device 300, the extend buffer pool may no longer be disposed in the first device 200. In other words, the first device 200 may release the extend buffer pool.

After the first device 200 and the second device 300 perform data migration, the second device 300 may enable an extend buffer pool 340 of the second device 300. The enabling the extend buffer pool of the second device means that the second device 300 may use the extend buffer pool 340 to store data with a high read/write frequency, and migrate data in a buffer pool 330 to the extend buffer pool 340. The second device 300 may further eliminate data with a low read/write frequency in the extend buffer pool 340.

Figure 3:
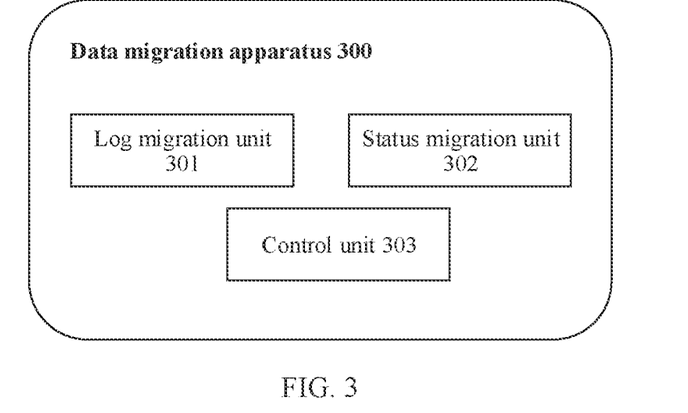
FIG. 3 is a schematic diagram of a structure of a data migration apparatus according to this disclosure.

Based on a same inventive concept as the method embodiment, an embodiment of this disclosure further provides a data migration apparatus. The data processing apparatus is configured to perform the method performed by the first device 200 in the method embodiment shown in FIG. 2. As shown in FIG. 3, the data migration apparatus 300 includes a log migration unit 301, a status migration unit 302, and a control unit 303. The foregoing modules may be software modules. Specifically, in the data migration apparatus 300, a connection is established between the units by using a communication path.

The log migration unit 301 is configured to migrate a redo log of a database from a first memory of a first device to a second memory, where the first memory and the second memory are deployed in different devices, and the second memory stores data in the database.

The status migration unit 302 is configured to perform operating system status migration with a second device.

In a possible implementation, the device further includes a control unit 402. The control unit 402 may disable an extend buffer pool in the first device before the status migration unit 302 performs operating system status migration with the second device. The extend buffer pool in the first device is configured to store data whose data read/write frequency is greater than a threshold in the database.

In a possible implementation, the first memory stores a first redo log and a second redo log. The log migration unit 301 may generate the first redo log based on a data change of the database. After determining that a database service deployed by the first device needs to be migrated to the second device, the log migration unit 301 copies data in the first redo log to the second redo log.

In a possible implementation, when migrating the redo log of the database from the first memory of the first device to the second memory, the log migration unit 301 may migrate the second redo log from the first memory to the second memory.

In a possible implementation, when copying the data in the first redo log to the second redo log, the log migration unit 301 may determine valid data in the first redo log based on a checkpoint and a latest write point in the first redo log, and then migrate the valid data to the second redo log.

In a possible implementation, after determining that the database service deployed by the first device needs to be migrated to the second device, and before migrating the second redo log from the first memory to the second memory, the log migration unit 301 may further update the first redo log and the second redo log based on the data change of the current database.

In a possible implementation, when disabling the extend buffer pool, the control unit 402 may stop migrating data in or out of the extend buffer pool, or may release storage space of the extend buffer pool in the first device.

Figure 4:
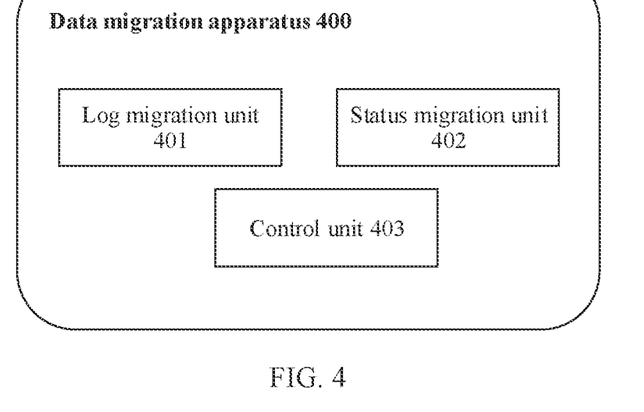
FIG. 4 is a schematic diagram of a structure of a data migration apparatus according to this disclosure.

Based on a same inventive concept as the method embodiment, an embodiment of this disclosure further provides a data migration apparatus. The data processing apparatus is configured to perform the method performed by the second device 300 in the method embodiment shown in FIG. 2. As shown in FIG. 4, the data migration apparatus 400 includes a log migration unit 401, a status migration unit 402, and a control unit 403. The foregoing modules may be software modules. Specifically, in the data migration apparatus 400, a connection is established between the units by using a communication path.

The log migration unit 401 is configured to migrate a redo log of a database from a second memory to a third memory of a second device, where the third memory and the second memory are deployed in different devices, and the second memory stores data in the database.

The status migration unit 402 is configured to perform operating system status migration with a first device.

In a possible implementation, the device further includes a control unit 403, and after performing operating system status migration with the first device, the control unit 403 is configured to:

enable an extend buffer pool in the second device, where the extend buffer pool in the second device is configured to store data whose data read/write frequency is greater than a threshold in the database.

Division into the modules in embodiments of this disclosure is an example, is only division into logical functions, and may be other division during actual implementation. In addition, functional modules in embodiments of this disclosure may be integrated into one processor, or each of the modules may exist alone physically, or two or more modules may be integrated into one module. The integrated module may be implemented in a form of hardware, or may be implemented in a form of a software functional module.

When the integrated module is implemented in the form of a software function module and sold or used as an independent product, the integrated module may be stored in a computer-readable storage medium. Based on such an understanding, the technical solutions of this disclosure essentially, or the part contributing to a conventional technology, or all or some of the technical solutions may be implemented in a form of a software product. The computer software product is stored in a storage medium and includes several instructions for instructing a terminal device (which may be a personal computer, a mobile phone, a network device, or the like) or a processor to perform all or some of the steps of the methods in embodiments of this disclosure. The foregoing storage medium includes any medium that can store program code, such as a USB flash drive, a removable hard disk drive, a read-only memory (ROM), a random access memory (RAM), a magnetic disk, or an optical disc.

Figure 5:
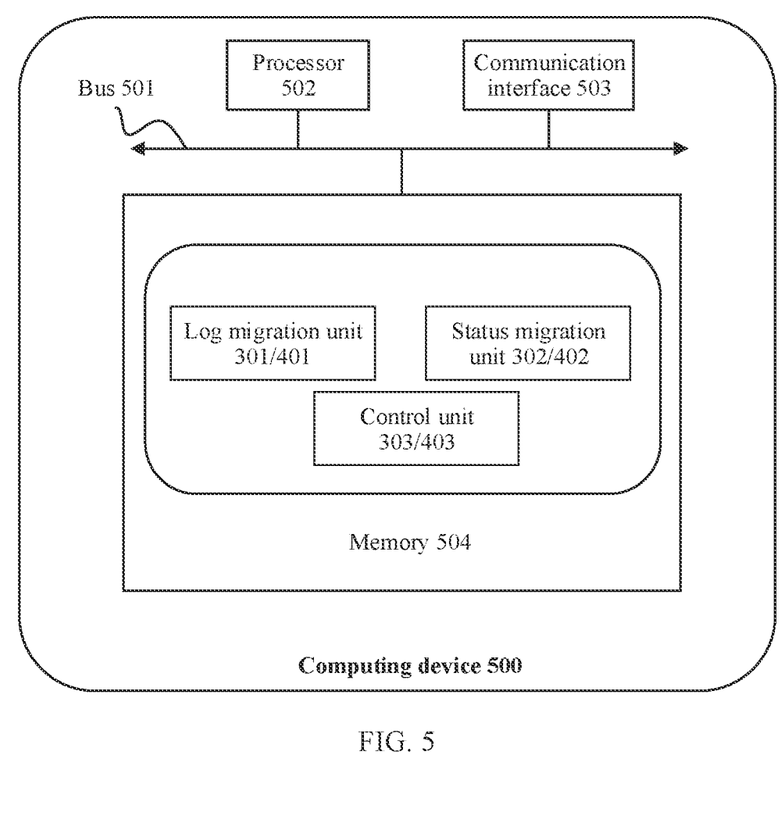
FIG. 5 is a schematic diagram of a computing device according to an embodiment of this disclosure.

FIG. 5 shows a computing device 500. The computing device 500 includes a bus 501, a processor 502, a communication interface 503, and a memory 504. The processor 502, the memory 504, and the communication interface 503 communicate with each other through the bus 501.

The processor 502 may be a central processing unit (CPU), and is corresponding to the processor 210 and the processor 310 shown in FIG. 1. The memory 504 may include a volatile memory, for example, a random access memory (RAM). Alternatively, the memory 504 may include a non-volatile memory, for example, a read-only memory (ROM), a flash memory, an HDD, or an SSD. The memory 504 may further include a first memory or a second memory. The memory 504 stores executable code, and the processor 502 executes the executable code to perform the foregoing data migration method (the method performed by the first device or the second device in the embodiment shown in FIG. 2). The memory 504 may further include another software module, for example, an operating system, for running a process. The operating system may be LINUX™, UNIX™, WINDOWS™, or the like.

Specifically, the memory 504 stores the modules in the foregoing data migration apparatus 300. The memory 504 may alternatively store the modules in the foregoing data migration apparatus 400. In addition to storing the foregoing plurality of modules, the memory 504 may further include another software module, for example, an operating system, for running a process. The operating system may be LINUX™. UNIX™, WINDOWS™, or the like.

This disclosure further provides a computing device system. The computing device system includes at least one computing device 600 shown in FIG. 6. The computing device 600 includes a bus 601, a processor 602, a communication interface 603, and a memory 604. The processor 602, the memory 604, and the communication interface 603 communicate with each other through the bus 601. The at least one computing device 600 in the computing device system communicates with each other by using a communication path.

Figure 6:
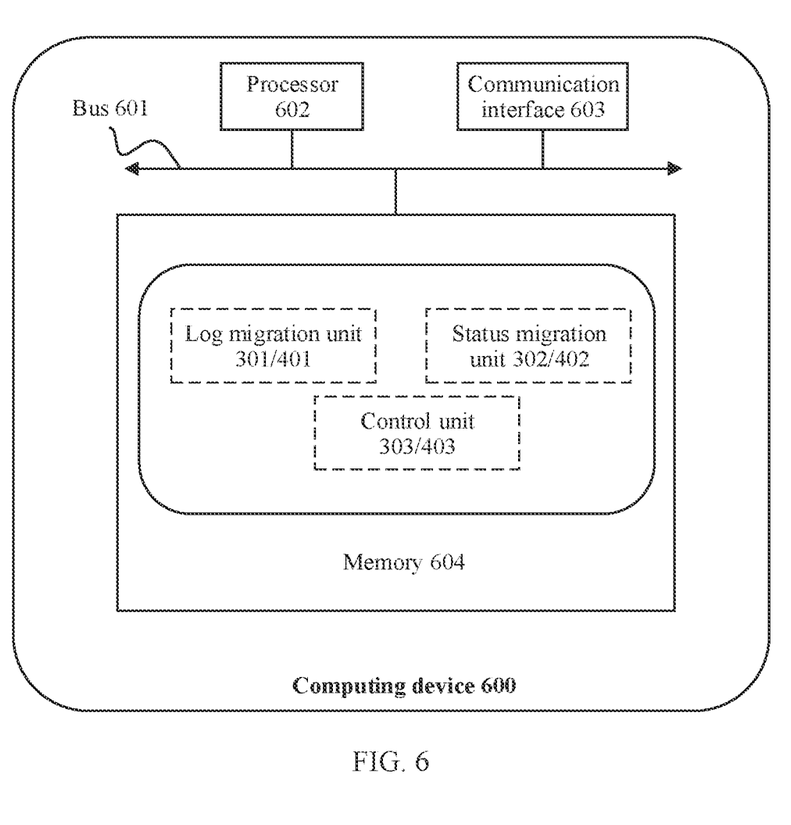
FIG. 6 is a schematic diagram of a computing device in a computing device system according to an embodiment of this disclosure.

The processor 602 may be a CPU, and is corresponding to the processor 210 and the processor 310 shown in FIG. 1. The memory 604 may include a volatile memory, for example, a random access memory. The memory 604 may further include a non-volatile memory, for example, a read-only memory, a flash memory, an HDD, or an SSD. The memory 604 may further include a first memory or a second memory. The memory 604 stores executable code, and the processor 602 executes the executable code to perform any part or all of the foregoing data migration method performed by the first device or the second device. The memory 604 may further include another software module, for example, an operating system, for running a process. The operating system may be LINUX, UNIX, WINDOWS™, or the like.

Specifically, the memory 604 stores any one or more modules of the foregoing data migration apparatus 300 or data migration apparatus 400. In addition to storing any one or more of the foregoing units, the memory 604 may further include another software module, for example, an operating system, for running a process. The operating system may be LINUX, UNIX, WINDOWS™, or the like.

The at least one computing device 600 in the computing device system establishes communication with each other by using a communication network, and any one or more units of a data processing apparatus 500 run on each computing device. The at least one computing device 600 jointly performs the foregoing data storage operations.

A description of a procedure corresponding to each of the accompanying drawings has a focus. For a part that is not described in detail in a procedure, refer to a related description of another procedure.

All or some of the foregoing embodiments may be implemented by using software, hardware, firmware, or any combination thereof. When software is used to implement embodiments, all or a part of embodiments may be implemented in a form of a computer program product. A data-synchronized computer program product includes one or more data-synchronized computer program instructions. When the data-synchronized computer program instructions are loaded and executed on a computer, all or some of the data synchronization procedures or functions according to embodiments of the present invention are generated.

The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium includes a readable storage medium that stores computer program instructions for training a classification model. The computer-readable storage medium may be any usable medium accessible by the computer, or a data storage device, for example, a server or a data center, integrating one or more usable media. The usable medium may be a magnetic medium (for example, a floppy disk, a hard disk drive, or a magnetic tape), an optical medium (for example, a DVD), or a semiconductor medium (for example, an SSD).

What is claimed is:

1. A data migration method for a database, wherein the method comprises:
in response to determining that a database service is to be switched from a first device to a second device, performing the following operations:
migrating a redo log of the database from a first memory of the first device to a second memory, wherein the second memory is independent of the first device and the second device, and wherein the first device comprises an extend buffer pool, wherein the extended buffer pool stores data prior to the switch of the database service for data whose read/write frequency is greater than a threshold;
disabling the extend buffer pool in the first device, wherein the disabling the extend buffer pool comprises:
stopping migrating data in or out of the extend buffer pool; and
deleting data that has been stored in the extend buffer pool; and
performing operating system status migration with the second device, wherein the performing operating system status migration comprises updating a status of a transmission control protocol (TCP)/Internet protocol (IP) protocol stack.

2. The method according to claim 1, wherein the first memory comprises a first redo log and a second redo log, and the method further comprises:
generating the first redo log based on a data change of the database; and
after determining that the database service is to be switched from the first device to the second device, copying data in the first redo log to the second redo log.

3. The method according to claim 2, wherein the migrating a redo log of the database from a first memory of the first device to the second memory comprises:
migrating the second redo log from the first memory to the second memory.

4. The method according to claim 3, wherein the copying data in the first redo log to the second redo log comprises:
determining valid data in the first redo log based on a checkpoint and a latest write point in the first redo log; and
copying the valid data to the second redo log.

5. The method according to claim 2, wherein after determining that the database service is to be switched from the first device to the second device, and before the migrating the second redo log from the first memory to the second memory, the method comprises:
updating the first redo log and the second redo log based on the data change of the database.

6. A computing device, comprising:
at least one processor; and
one or more memories coupled to the at least one processor and storing programming instructions for execution by the at least one processor to cause the computing device to:
in response to determining that a database service is to be switched from a first device to a second device:
migrate a redo log of a database from a first memory of a first device to a second memory, wherein the second memory is independent of the first device and a second device, and wherein the first device comprises an extend buffer pool, wherein the extended buffer pool stores data prior to the switch of the database service for data whose read/write frequency is greater than a threshold;
disable the extend buffer pool in the first device, wherein the disable the extend buffer pool comprises:
stop migrating data in or out of the extend buffer pool; and
delete data that has been stored in the extend buffer pool; and
and
perform operating system status migration with the second device, wherein the perform operating system status migration comprises update a status of a transmission control protocol (TCP)/Internet protocol (IP) protocol stack.

7. The computing device according to claim 6, wherein the first memory comprises a first redo log and a second redo log, and the programming instructions, when executed by the at least one processor, cause the computing device to:
generate the first redo log based on a data change of the database; and
after determining that a database service is to be switched from the first device to the second device, copy data in the first redo log to the second redo log.

8. The computing device according to claim 7, wherein the programming instructions, when executed by the at least one processor, cause the computing device to:
when migrating the redo log of the database from the first memory of the first device to the second memory, migrate the second redo log from the first memory to the second memory.

9. The computing device according to claim 8, wherein the programming instructions, when executed by the at least one processor, cause the computing device to:
when copying the data in the first redo log to the second redo log, determine valid data in the first redo log based on a checkpoint and a latest write point in the first redo log; and
copy the valid data to the second redo log.

10. The computing device according to claim 7, wherein the programming instructions, when executed by the at least one processor, cause the computing device to:
after determining that the database service is to be switched from the first device to the second device, and before migrating the second redo log from the first memory to the second memory, update the first redo log and the second redo log based on the data change of the database.

11. One or more non-transitory computer-readable media storing computer instructions, that when executed by one or more processors, cause a computer to perform operations comprising:
in response to determining that a database service is to be switched from a first device to a second device, performing the following operations:
migrating a redo log of the database from a first memory of the first device to a second memory, wherein the second memory is independent of the first device and the second device, and wherein the first device comprises an extend buffer pool, wherein the extended buffer pool stores data prior to the switch of the database service for data whose read/write frequency is greater than a threshold;
disabling the extend buffer pool in the first device, wherein the disabling the extend buffer pool comprises:
stopping migrating data in or out of the extend buffer pool; and
deleting data that has been stored in the extend buffer pool; and
performing operating system status migration with the second device, wherein the performing operating system status migration comprises updating a status of a transmission control protocol (TCP)/Internet protocol (IP) protocol stack.

12. The one or more non-transitory computer-readable media according to claim 11, wherein the first memory comprises a first redo log and a second redo log, and the operations further comprise:
generating the first redo log based on a data change of the database; and
after determining that the database service is to be switched from the first device to the second device, copying data in the first redo log to the second redo log.

13. The one or more non-transitory computer-readable media according to claim 12, wherein the migrating a redo log of the database from a first memory of the first device to the second memory comprises:
migrating the second redo log from the first memory to the second memory.

14. The one or more non-transitory computer-readable media according to claim 13, wherein the copying data in the first redo log to the second redo log comprises:
determining valid data in the first redo log based on a checkpoint and a latest write point in the first redo log; and
copying the valid data to the second redo log.

15. The one or more non-transitory computer-readable media according to claim 12, wherein after determining that the database service is to be switched from the first device to the second device, and before the migrating the second redo log from the first memory to the second memory, the operations comprise:
updating the first redo log and the second redo log based on the data change of the database.

\* \* \* \* \*

UNITED STATES PATENT AND TRADEMARK OFFICE
CERTIFICATE OF CORRECTION

PATENT NO. : 12,130,712 B2  
APPLICATION NO. : 17/947388  
DATED : October 29, 2024  
INVENTOR(S) : Gang Xiong Page 1 of 1

It is certified that error appears in the above-identified patent and that said Letters Patent is hereby corrected as shown below:

In the Claims

In Column 12, In Line 65, In Claim 6, below "pool; and" delete "and".

Signed and Sealed this  
Eighteenth Day of February, 2025

Coke Morgan Stewart  
*Acting Director of the United States Patent and Trademark Office*